United States Patent [19]

Matsunami et al.

[11] E Re. 29,340

[45] Reissued Aug. 2, 1977

[54] COMPOSITE FILM

[75] Inventors: Koichi Matsunami; Ikuya Hayashi, both of Otsu, Japan

[73] Assignee: Toyo Boseki Kabushiki Kaisha, Japan

[21] Appl. No.: 730,464

[22] Filed: Oct. 7, 1976

Related U.S. Patent Documents

Reissue of:

[64] Patent No.: 3,843,479
Issued: Oct. 22, 1974
Appl. No.: 213,811
Filed: Dec. 29, 1971

[30] Foreign Application Priority Data

Dec. 29, 1970 Japan ..... 46-128180
Dec. 29, 1970 Japan ..... 46-128181

[51] Int. Cl.[2] ..... B32B 7/02

[52] U.S. Cl. ..... 428/216; 428/474; 428/339; 428/910; 428/334; 428/337

[58] Field of Search ..... 260/78 R; 264/289; 428/215, 216, 474, 500, 523, 910

[56] References Cited

U.S. PATENT DOCUMENTS

| | | | |
|---|---|---|---|
| 2,766,221 | 10/1956 | Lum et al. | 260/78 R |
| 3,370,972 | 2/1968 | Nagel et al. | 117/7 |
| 3,423,231 | 1/1969 | Lutzman | 117/68.5 |
| 3,467,568 | 9/1969 | Williams et al. | 161/146 |
| 3,502,766 | 3/1970 | Tsuruta et al. | 264/289 |
| 3,536,804 | 10/1970 | Fujimoto et al. | 264/210 |
| 3,570,748 | 3/1971 | Coyle et al. | 229/53 |
| 3,651,200 | 3/1972 | Kuga et al. | 264/289 |
| 3,652,759 | 3/1972 | Schlemmer et al. | 264/289 |
| 3,697,368 | 10/1972 | Bhuta et al. | 161/227 |
| 3,740,246 | 6/1973 | Kuga | 117/7 |
| T872,009 | 3/1970 | Keith et al. | 260/47.75 |

*Primary Examiner*—George F. Lesmes
*Assistant Examiner*—William R. Dixon, Jr.
*Attorney, Agent, or Firm*—Birch, Stewart, Kolasch and Birch

[57] ABSTRACT

A composite film comprising (A) a biaxially drawn film of a polyamide containing in the molecule not less than 70% (mol) of the repeating unit consisting of metaxylylenediamine or its mixture with paraxylylenediamine (of which the content is not more than 30% (mol) on the basis of the total amount of metaxylylenediamine and paraxylylenediamine) and an $\alpha,\omega$-aliphatic dicarboxylic acid having 6 to 10 carbon atoms and (B) a layer of a thermoplastic resin having a melting point or a softening point at least 50° C. below the melting point or the softening point of the polyamide provided on at least one surface of the biaxially drawn film.

11 Claims, No Drawings

COMPOSITE FILM

Matter enclosed in heavy brackets [ ] appears in the original patent but forms no part of this reissue specification; matter printed in italics indicates the additions made by reissue.

The present invention relates to a composite film having an excellent gas barrier property and a high heat seal strength.

A biaxially drawn film of a metaxylene group-containing polyamide is provided with a variety of advantageous physical and mechanical properties such as breaking strength, yield strength, heat stability and waterproof property. It is particularly excellent in its gas-barrier property. For instance, the [gas-permeability] *oxygen-permeability* constant of such a film is normally $9 \times 10^{-13}$ ml. cm./cm.$^2$ sec. cm. Hg or less, which is markedly smaller than that of a biaxially drawn film of polyethylene terephthalate (i.e., about $3 \times 10^{-12}$ ml. cm./cm.$^2$sec. cm. Hg) and that of a biaxially drawn film of polycapramide (i.e., about $2 \times 10^{-12}$ ml. cm./cm.$^2$ sec. cm. Hg). However, the melting point of the said film is higher than the temperature (i.e., around 170 to 180° C.) usually adopted for heat sealing. In addition, the film tends to shrink on heating. Thus, it is difficult to heat seal and, even if partly heat sealed, a broad heat sealing area cannot be achieved and the heat seal strength resulting therefrom is not sufficient. These drawbacks prevent the film from being used as a packaging material.

The principal object of the present invention is to embody a composite film of a metaxylylene group-containing polyamide provided with favorable physical and mechanical properties, particularly an excellent gas-barrier property, and film having an improved heat seal strength.

According to the present invention, there is provided a composite film comprising (A) a biaxially drawn film of a polyamide containing in the molecule not less than 70% (mol) of the repeating unit consisting of metaxylylenediamine or its mixture with paraxylylenediamine (of which the content is not more than 30% (mol) on the basis of the total amount of metaxylylenediamine and paraxylylenediamine) and an $\alpha,\omega$-aliphatic dicarboxylic acid having 6 to 10 carbon atoms and (B) a layer of a thermoplastic resin having a melting point or a softening point at least 50° C. below the melting point or the softening point of the polyamide provided on at least one surface of the biaxially drawn film.

The biaxially drawn film having the following physical constants:

(1) [Gas] *Oxygen* permeability constant (at 30° C.): not more than $9 \times 10^{-13}$ ml. cm./cm.$^2$ sec. cm. Hg;

(2) Plan orientation index: not less than 0.025;

(3) Degree of balance: not more than 0.045;

(4) Breaking strength: not less than 10 kg./mm.$^2$ in machine and transverse directions;

(5) Breaking elongation: 30 to 150% in machine and transverse directions;

(6) Yield strength: not less than 5 kg./mm.$^2$ in machine and transverse directions; and (7) Yield elongation: 2 to 6% in machine and transverse directions;

And the composite film having the following physical constant:

(8) [Gas] *Oxygen* transmission rate (at 30° C.): not more than 50 ml./m.$^2$·24 hr.·atm., when measured by the procedures as hereinafter described.

In the polyamide used for the formation of a biaxially drawn film as the base layer, the amount of paraxylylenediamine is to be not more than 30% (mol), on the basis of the total amount of metaxylylenediamine and paraxylylenediamine, if the latter is employed. Further, the repeating unit consisting of the xylylenediamine and the $\alpha,\omega$-aliphatic dicarboxylic acid should be included in an amount not less than 70% (mol) in the molecule chain.

The polyamide may be the one having a relative viscosity of about 2.0 to 4.0, particularly of about 2.2 to 3.0, when determined by the procedure as hereinafter described.

Examples of the polyamide include homopolymers such as polymetaxylylene adipamide, polymetaxylylene sebacamide and polymetaxylylene suberamide, and copolymers such as metaxylylene/paraxylylene adipamide, metaxylylene/paraxylylene pimelamide, metaxylylene/paraxylylene sebacamide and metaxylylene/paraxylylene azelamide.

The copolymers prepared from such monomer components as in the above exemplified homopolymers and copolymers and aliphatic diamines (e.g. hexamethylenediamine), alicyclic diamines (e.g. piperazine), aromatic diamines (e.g. p-bis-(2-aminoethyl)-benzene), aromatic dicarboxylic acid (e.g. terephthalic acid), lactams (e.g. $\epsilon$-caprolactam), $\omega$-aminocarboxylic acids (e.g. 7-aminoheptanoic acid), aromatic aminocarboxylic acids (e.g. p-aminomethylbenzoic acid) and the like are also utilizable.

In addition to the said polyamide itself, the biaxially drawn film may contain any other polymer (e.g. polycapramide, polyhexamethylene adipamide, polyhexamethylene sebacamide, polyundecanamide, polyethylene terephthalate, polyethylene, polypropylene), an antistatic agent, a lubricant, an antiblocking agent, a stabilizer, a dyestuff, a pigment and the like.

The biaxially drawn film can be manufactured by biaxially drawing an undrawn film simultaneously or stepwise.

The undrawn film is a substantially unoriented film manufactured by a per se conventional process such as melt process (e.g. T-die method, inflation method), wet process or dry process. When, for instance, the undrawn film is manufactured by the T-die method according to the melt process, the polyamide incorporated with or without any additive is heated at a temperature higher than the melting point, the melted polyamide is extruded through a T-die and the resulting film is cooled by a roll or a liquid bath maintained at about 30 to 70° C, to a temperature lower than the secondary transition point. In the case of the temperature of the roll or the liquid bath being higher than the secondary transition point, the resulting film tends not to be flat and tends to have lines so that even drawing in the subsequent step is effected with difficulty. The said "secondary transition point" can be determined by the use of a dilatometer on the temperature dependency of the specific volume.

Alternatively, the biaxially drawn film may be manufactured by extruding the polyamide incorporated with or without any additive according to the inflation method, followed by immediate biaxial drawing.

The drawing is effectively accomplished at a temperature higher than the second transition point and lower than the melting point of the polyamide.

The draw ratio is usually not less than 2, preferably not less than 2.5 in one direction. The draw ratio in the machine direction may be the same as or different from that in the transverse direction.

The [smultaneous] *simultaneous* biaxial drawing may be effected by a conventional procedure such as the tenter method or the inflation method.

In case of the stepwise drawing, the drawing may be ordinarily carried out between two or more sets of rolls which are arranged in the advancing direction and have different rotation speeds with respect to each other. For drawing the film transversely, both edges of the film are held by tenter clips, and drawing is effected in a tenter while the film is heated. The order of the drawing in the machine and transverse directions may be optional. In other words, the drawing may be effected first in the machine direction and then in the transverse direction or vice versa.

The drawn film thus obtained by simultaneous or stepwise biaxial drawing shows, as such, various favorable properties. If necessary, it may be further subjected to heat treatment at a temperature between about 5° C. above the drawing temperature in manufacturer of the drawn film and the melting temperature of the drawn film for a period of not more than about 5 minutes, preferably for about 15 to 60 seconds. During the heat treatment, the film may be kept under a tensioned or relaxed state. As the result of the heat treatment, the degree of crystallinity of the film increases and the strain of the film produced in the drawing process is eliminated so that the mechanical property and the dimensional stability of the film are considerably improved.

As the base layer for the composite film of the invention, there is used the biaxially drawn film as above prepared, which has the following physical constants:

(1) [Gas] *Oxygen* permeability constant: not more than $9 \times 10^{-13}$ ml. cm./cm.$^2$ sec. cm. Hg, preferably not more than $7 \times 10^{-13}$ ml. cm./cm.$^2$ sec. cm. Hg;

(2) Plane orientation index: not less than 0.025;

(3) Degree of balance: not more than 0.045;

(4) Breaking strength: not less than 10 kg./mm.$^2$, preferably between 14 and 30 kg./mm.$^2$ in machine and transverse directions;

(5) Breaking elongation: 30 to 150%, preferably 40 to 120% in machine and transverse directions;

(6) Yield strength: not less than 5 kg./mm.$^2$, preferably between 7 and 15 kg./mm.$^2$ in machine and transverse directions; and (7) Yield elongation: 2 to 6%, preferably 3 to 5% in machine and transverse directions.

The thermoplastic resin as the coating layer to be provided on at least one surface of the drawn film may be one having a melting point or a softening point at least 50° C. below the melting point or the softening point of the polyamide constituting the drawn film. It is favorably provided with such a property that, when the ultimate composite film is rolled, the coating layer made thereof does not produce blocking at room temperature. If the difference between the melting point or the softening point of the polyamide and the melting point or the softening point of the thermoplastic resin is less than 50° C., the drawn film will deteriorate or shrink due to heat when heat sealing is made. The melting point or the softening point of the thermoplastic resin is usually not higher than about 170° C., favorably from about 50 to 150° C.

Specific examples of the thermoplastic resin are homopolymers and copolymers of vinyl compounds (e.g. vinyl chloride, vinyl acetate, styrene, acrylic acid, methyl acrylate, ethyl acrylate, propyl acrylate, butyl acrylate, methacrylic acid, methyl methacrylate, ethyl methacrylate, propyl methacrylate, butyl methacrylate, acrylonitrile, methacrylonitrile, acrylamide, vinyl ether, vinylpyrrolidone, vinylidene compounds (e.g. vinylidene chloride, vinylidene cyanide), α-olefin compounds (e.g. ethylene, propylene, butene, pentene, hexene), diene compounds (e.g. butadiene, isoprene, chloroprene), and their halogenated derivatives, sulfonated derivatives, sulfochlorinated derivatives and aminated derivatives. Polyesters, polyamides, polyurethanes, polyureas and other polycondensation or polyaddition compounds may be also employed as the thermoplastic resin.

In order to improve the bond strength and/or the heat seal strength of the coating layer, an appropriate additive such as a plasticizer may be incorporated into the thermoplastic resin. Any other additive such as an antiblocking agent, an antistatic agent or a lubricant may be also incorporated therein.

The thermoplastic resin may be layered on the base layer of the drawn film by a per se conventional procedure such as laminating, coating, spraying or the like so as to form a coating layer.

In the case of coating, for instance, a solution or dispersion containing the thermoplastic resin may be applied partly or wholly to at least one of the surfaces of the drawn film as the base layer, and the resulting layered product is dried to give a composite film. The application may be effected by a per se conventional procedure such as gravure roll method, reverse roll method, Mayer bar method or air knife method.

The amount of the thermoplastic resin to be applied depends upon the use of the resulting composite film. For a packaging sheet to be used in an automatic packaging machine, the thickness of the coating layer may be from about 1 to 2μ. For a packaging sheet to be used in the form of a bag for light or middle weight goods, the thickness may be from about 2 to 10μ.

In order to increase the bond strength between the base layer and the coating layer, a conventional adhesive agent may be incorporated into the thermoplastic resin or precoated on the surface of the coating layer prior to formation of the coating layer.

In the case of laminating, for instance, the thermoplastic resin may be melt extruded on the surface of the drawn film as the base layer (i.e. extrusion lamination). Alternatively, a conventional binding agent may be applied on the surface of at least one of the drawn film as the base layer and a film made of the thermoplastic resin as the coating layer and, after drying the applied binding agent, both of the films may be combined each other (i.e. dry lamination). In the extrusion lamination, the thermoplastic resin may be melt extruded directly on the surface of the drawn film or, after application of a conventional anchor coating agent on the surface of the drawn film followed by drying, melt extruded thereon. Examples of the anchor coating agent are organic titanium compounds, polyalkyleneimine, isocyanates, acrylic compounds, etc. For the extrusion lamination, polyolefins (particularly polyethylene) are the preferred thermoplastic resin in view of easy processability, low cost, high heat seal strength and the like.

Unfortunately, however, the composite film obtained by the use of polyethylene for the coating layer is somewhat inferior in transparency. For production of the composite film excellent in transparency, the dry lamination of a drawn or undrawn film of polypropylene as the coating layer on the drawn film as the base layer is recommended.

The thus obtained composite film has an excellent gas-barrier property and shows a heat seal strength.

The [gas] *oxygen* transmission rate of the composite film of the invention is not more than 50 ml./m.$^2$·24 hr.·atm., mostly not more than 30 ml./m.$^2$·24 hr.·atm. For instance, in case of the composite film of the invention of around 15μ thick obtained by coating the thermoplastic resin in a thickness of 1 to 3μ on the suface of the drawn film as the base layer, the [gas] *oxygen* transmission rate is ordinarily not more than 15 ml.m.$^2$24 hr. atm., which is about ½ or less that of a composite film obtained by coating polyvinylidene chloride in a thickness of 3μ on the surface of a film of polyethylene terephthalate of 20μ thick. Further, for instance, in case of the composite film of the invention obtained by laminating a film of the thermoplastic resin of 10 to 50μ thick on the surface of the drawn film of around 15μ thick as the base layer the [gas] *oxygen* transmission rate is normally not more than 15 ml./m.$^2$·24 hr.·sec. atm., which is so low as not readily realized by any conventional composite film.

The heat sealing with the composite film of the invention may be carried out at a temperature of about 70 to 160° C., preferably of about 80 to 150° C.

The composite film obtained by coating can afford a heat seal strength of not less than about 40 g./cm., usually of about 50 to 300 g./cm. The composite film obtained by laminating may give a heat seal strength of not less than about 300 g./cm., usually of about 500 to 3000 g./cm.

The thickness of the composite film is substantially of no limitation and may be usually from about 6 to 200μ, favorably from about 6 to 100μ. The thickness of the drawn film as the base layer and the thickness of the thermoplastic resin as the laminating layer may be each not less than about 5μ. Preferred are about 10 to 50μ and about 10 to 100μ respectively for the thickness of the drawn film and the thickness of the laminated thermoplastic resin.

The composite film of the invention has, as stated above, an excellent gas-barrier property, a high heat seal strength and various advantageous mechanical properties. Thus, it is useful as a packaging material, particularly for such goods as being apt to be deteriorated, colored, deflavored and so on. Since the mechanical strength and the heat seal strength are quite excellent, it can be used for packaging of goods of heavy weights.

Practical and presently preferred embodiments of the present invention are illustratively shown in the following examples wherein "MD" and "TD" indicate respectively "machine direction" and "transverse direction." Measurement of the physical constants is carried out as follows:

Relative viscosity:

Measured on a solution in 96% sulfuric acid at a concentration of 1 g./100 ml. at 25° C.

Heat seal strength:

The surfaces of the coating layer of the composite film are heat sealed each other. The strength on peeling in T-letter is measured by a tensile tester ("Tensiron").

Peel strength:

As the test piece, the composite film of 1 cm. wide is used. The coating layer is peeled off from the base layer at an angle of 180° with a rate of 200 mm./min. The strength on peeling is measured by a tensile tester ("Tensiron.")

Breaking strength; breaking elongation:

Measured according to ASTM-882.

Yield strength; yield elongation:

Measured according to ASTM-882.

Haze value:

Determined by the use of a haze tester (manufactured by Toyo Seiki K.K.) and calculated according to the following equation:

$$\text{Haze value} = A - B/A \times 100$$

wherein A is a total quantity of transmitted light and A−B is a quantity of diffused light.

[Gas] *Oxygen* transmission rate; [gas] *oxygen* permeability constant:

Measured by the use of a gas permeability measuring apparatus (manufactured by Rika Seiki Kogyosha) at 30° C. according to ASTM-1434-58.

Plane orientation index; degree of balance:

Refractive indexes of a test piece in longitude (x), latitude (y) and thickness (z) are measured by the use of a refractometer, and the plane orientation index and the degree of balance are calculated according to the following equations:

$$\text{Plane orientation index} = x + y/2 - z$$

$$\text{Degree of balance} = |x - y|$$

EXAMPLE 1

A metaxylylene/paraxylylene adipamide copolymer (molar ratio of metaxylylene/paraxylylene=70/30; relative viscosity, 2.17; melting point, 255° C.) is melted at 286° C. and extruded through a flat die onto a cooling roll to give an undrawn film. The undrawn film is drawn in a machine direction at a draw ratio of 4.2 by the aid of a set of rolls heated at 105° C. and then in a transverse direction at a draw ratio of 3.75 in a tenter kept at 115° C. The drawn film is subjected to heat treatment at 215° C. for 15 seconds to give a film of 15μ thick. The physical constants of the film are as follows:

(1) [Gas] *Oxygen* permeability constant: $1.6 \times 10^{-13}$ ml. cm./cm.$^2$ sec. cm. Hg.

(2) Plane orientation index: 0.036.

(3) Degree of balance: 0.0011.

(4) Breaking strength: MD, 24.9 kg./mm.$^2$; TD, 25.4 kg./mm.$^2$.

(5) Breaking elongation: MD, 65%; TD, 39%.

(6) Yield strength: MD, 11.0 kg./mm.$^2$; TD, 11.6 kg./mm.$^2$.

(7) Yield elongation: MD, 2.8%; TD, 3.4%.

A vinyl chloride/vinylidene chloride copolymer (molar ratio, 85/15) is dissolved in a toluene-methylethylketone mixture (70/30 by weight) to make a 20% resin solution. The resin solution is applied on one surface of the above obtained film according to the gravure roll method, and the resulting film is dried at 110° C. for 10 seconds to give a transparent composite film. The heat seal strength of the composite film when heat sealed at 150° C. and the peel strength between the base layer and the coating layer in the composite film are measured and shown in Table 1.

EXAMPLE 2

A metaxylylene/paraxylylene adipamide copolymer (molar ratio, 99/1; relative viscosity, 2.28; melting point, 236° C.) is melted at 275° C. and extruded through a flat die onto a cooling roll to give an undrawn film. The undrawn film is drawn in one direction in a machine direction at a draw ratio of 3.75 at 87° C. between two rolls which are rotating at a different velocity and then in a transverse direction at a draw ratio of 4.3 in a tenter kept at 110° C. The drawn film is subjected to heat treatment at 210° C. for 20 seconds to give a film of 15μ thick. The physical constants of the film are as follows:

(1) [Gas] *Oxygen* permeability constant: $1.7\times10^{-13}$ ml. cm./cm.$^2$ sec. cm. Hg.

(2) Plane orientation index: 0.040.

(3) Degree of balance: 0.024.

(4) Breaking strength: MD, 19.1 kg./mm.$^2$; TD, 27.1 kg./mm.$^2$.

(5) Breaking elongation: MD, 91%; TD, 56%.

(6) Yield strength: MD, 9.8 kg./mm.$^2$; TD, 9.6 kg./mm.$^2$.

(7) Yield elongation: MD, 3.5%; TD, 3.0%.

A mixture of a vinyl chloride/vinylidene chloride copolymer (molar ratio, 85/15) and chlorinated paraffin (chlorine content, 40% by weight) in a ratio of 90/10 by weight is dissolved in a toluene-methylethylketone mixture (70/30 by weight) to make a 20% resin solution. The resin solution is applied on one surface of the above obtained film according to the gravure roll method, and the resulting film is dried at 110° C. for 10 seconds to give a transparent composite film. The heat seal strength of the composite film when heat sealed at 150° C., and the peel strength between the base layer and the coating layer in the composite film are measured and shown in Table 1.

EXAMPLE 3

On one surface of a biaxially drawn film of 15μ thick produced as in Example 2, a 15% solution of a vinylidene chloride/acrylonitrile copolymer (molar ratio, 90/10) in tetrahydrofuran is applied according to the gravure roll method, and the films dried at 120° C. for 30 seconds to make a coating layer of about 2μ thick. The heat seal strength of the composite film when heat sealed and the peel strength between the base layer and the coating layer in the composite film are measured and shown in Table 1.

EXAMPLE 4

On one surface of a biaxially drawn film of 15μ thick produced as in Example 2, a 50% aqueous emulsion of a vinylidene chloride/methyl acrylate copolymer (molar ratio, 90/10) is applied according to the air knife method, and the film is dried at 120° C. for 30 seconds to make a transparent coating layer of about 3μ thick. The heat seal strength of the composite film when heat sealed and the peel strength between the base layer and the coating layer in the composite film are measured and shown in Table 1.

EXAMPLE 5

A mixture of an ethylene/vinyl acetate copolymer (vinyl acetate content, 28 mol percent) and a low molecular weight polyethylene (molecular weight, 1,000 to 4,000) in a ratio of 75/25 by weight is dissolved in a toluene-methylethylketone mixture (70/30 by weight) under heating to make a 20% resin solution. The resin solution is applied on one surface of a biaxially drawn film of 15μ thick produced as in Example 1 according to the gravure roll method, and the film is dried at 100° C. for 10 seconds. The coated amount of the resin is 3.5 g./m.$^2$ at dryness. The heat seal strength of the composite film when heat sealed and the peel strength between the base layer and the coating layer in the composite film are measured and shown in Table 1.

EXAMPLE 6

On one surface of a biaxially drawn film of 15μ thick produced as in Example 1, a 10% toluene solution of an ethylene/vinyl acetate copolymer (vinyl acetate content, 28 mol percent) is applied, and the film is dried at 100° C. for 10 seconds to make an undercoat of about 1μ thick. A 10% solution of a vinyl chloride/vinyl acetate copolymer (molar ratio, 85/15) in a toluene-ethyl acetate mixture (70/30 by weight) is applied on the undercoat to make a surface coat of about 2μ thick. The heat seal strength of the composite film when heat sealed and the peel strength between the base layer and the coating layer in the composite film are measured and shown in Table 1.

REFERENCE EXAMPLE 1

A biaxially drawn film of 15μ thick produced as in Example 2 is subjected to heat adhesion at 130° C. under 1 kg./cm.$^2$ for 1 second, but no heat seal is seen at all. Even at a higher temperature such as 180° C., heat seal is not caused under 1 kg./cm.$^2$ to 1 second.

REFERENCE EXAMPLE 2

On one surface of a biaxially drawn film of polypropylene of 20μ thick or of a biaxially drawn film of polyethylene terephthalate of 20μ thick, a 50% aqueous emulsion of a vinylidene chloride/methyl acrylate copolymer (molar ratio, 90/10) is applied to make a transparent coating layer of about 3μ thick. The heat seal strength of the composite film when heat sealed and the peel strength between the base layer and the coating layer in the composite film are measured and shown in Table 2 wherein those measured on the composite film as produced in Example 4 are also shown.

A metaxylylene/paraxylylene adipamide copolymer (molar ratio of metaxylylene/paraxylylene = 99/1; relative viscosity, 2.28; melting point, 236° C.) is melted at 275° C. and extruded through a flat die onto a cooling to give an undrawn film. The undrawn film is drawn in a machine direction at a draw ratio of 3.75 by the aid of a roll heated at 87° C. and then in a transverse direction at a draw ratio of 4.3 in a tenter kept at 110° C. The drawn film is subjected to heat treatment at 210° C. for 15 seconds to give a film of 12μ thick. The physical constants of the film are as follows:

(1) [Gas] *Oxygen* permeability constant: $1.7\times10^{-13}$ ml. cm./cm.$^2$ sec. cm. Hg.

(2) Plane orientation index: 0.039.

(3) Degree of balance: 0.021.

(4) Breaking strength: MD, 20.2 kg./mm.$^2$; TD, 26.5 kg./mm.$^2$.

(5) Breaking elongation: MD, 86%; TD, (6) Yield strength: MD, 9.7 kg./mm.$^2$; TD, (7) Yield elongation: MD, 3.4%; TD, 2.9%.

An anchor coating agent (concentration, 4%) is applied on one surface of the above obtained film and, after drying in a dryer of 2 m. in length at 110° C., polyethylene ("Petrosen 205" manufactured by Mitsui Polychemical Co., Ltd.) is melt extruded at 330° C. with a rate of 60 m./min. on the surface to give a coating layer of 40μ. The heat seal strength of the composite film when heat sealed at 140° C. under 2 kg./cm.² for 1 second and the peel strength between the base layer and the coating layer in the composite film are measured and shown in Table 3.

EXAMPLE 8

A metaxylylene/paraxylylene adipamide copolymer (molar ratio of metaxylylene/paraxylylene=70/30; relative viscosity, 2.17; melting point, 2.55° C.) is melted at 286° C. and extruded through a flat die onto a cooling roll to give an undrawn film. The undrawn film is drawn in a machine direction at a draw ratio of 4.2 by the aid of a set of rolls heated at 105° C. and then in a transverse direction at a draw ratio of 3.75 in a tenter kept at 115° C. The drawn film is subjected to heat treatment at 215° C. for 15 seconds to give a film of 12μ thick. The physical constants of the film are as follows:

(1) [Gas] *Oxygen* permeability constant: $1.6\times10^{-13}$ ml. cm./cm.² sec. cm. Hg.

(2) Plane orientation index: 0.035.

(3) Degree of balance: 0.0012.

(4) Breaking strength: MD, 23.8 kg./mm.², TD, 25.1 kg./mm.².

(5) Breaking elongation: MD, 71%; TD, 45%.

(6) Yield strength: MD, 11.5 kg./mm.², TD, 12.1 kg./mm.².

(7) Yield elongation: MD, 3.3%; TD, 3.7%.

A binding agent (concentration, 15%) is applied on one surface of the above obtained film and, after drying by passing through a dryer of 2 m. in length at a rate of 30 m./min., an undrawn film of polypropylene of 25μ thick is laminated thereon at a temperature of 60 to 70° C. under a pressure of 5 kg./cm.². The heat seal strength of the resulting composite film when heat sealed at 150° C. under 1 kg./cm.² for 1 second and the peel strength between the base layer and the coating layer in the composite film are measured and shown in Table 4.

The composite film obtained in this Example is quite excellent in transparency and the haze value is less than 5%.

EXAMPLE 9

Miso (bean paste) is packaged with a composite film consisting of a biaxially drawn film of polyamide and a polyethylene film prepared as in Example 7 (film (A)), a composite film consisting of a biaxially drawn film of polyethylene terephthalate of 12μ thick and a polyethylene film of 50μ thick coated with polyvinylidene chloride of about 3μ thick (film (B)), a composite film consisting of a biaxially drawn film of polypropylene of 20μ thick and a polyethylene film of 50μ (film (C)) or a composite film consisting of a biaxially drawn film of polyamide and a polypropylene film prepared as in Example 8 (film (D)), and the packaged product is allowed to stand at 20 to 25° C. The [gas] *oxygen* transmission rate of each composite film before packaging and the color change of each composite film after packaging are measured and shown in Table 5.

From Table 5, is is seen that the composite film of the invention (i.e., films (A) and (D)) is extremely smaller than the conventional composite film (i.e., films (B) and (C)) in the [gas] *oxygen* transmission rate and changes to brown with much difficulty.

TABLE 1

| | Thermoplastic resin as the coating layer | Heat seal strength (g./cm.) | Peel strength (g./cm.) | [Gas] Oxygen transmission rate (ml./m.², 24 hr.·atm.) | Breaking strength (kg./mm.²) MD | TD |
|---|---|---|---|---|---|---|
| Example number: | | | | | | |
| 1 | Vinyl chloride/vinylidene chloride copolymer | 71.0 | 29.0 | 7.1 | 24.8 | 25.2 |
| 2 | Vinyl chloride/vinylidene chloride copolymer plus chlorinated paraffin. | 120.0 | 42.0 | 7.9 | 19.2 | 27.3 |
| 3 | Vinylidene chloride/acrylonitrile copolymer | 115.0 | (1) | 5.2 | 18.9 | 27.4 |
| 4 | Vinylidene chloride/methyl acrylate copolymer | 162.5 | 94.0 | 5.5 | 19.4 | 27.0 |
| 5 | Ethylene/vinyl acetate copolymer plus polyethylene | 297.0 | (1) | 6.9 | 25.0 | 25.5 |
| 6 | Ethylene/vinyl acetate copolymer plus vinyl chloride/vinyl acetate copolymer. | 153.2 | (1) | 7.2 | 24.7 | 25.3 |
| Reference example 1 | None | 0 | | 7.4 | 19.1 | 27.1 |

(1) Not peeled.

TABLE 2

| Example number | Composite film | Heat seal strength (g./cm.) | Peel strength (g./cm.) | [Gas] Oxygen transmission (ml./m.², 24 hr.·atm.) |
|---|---|---|---|---|
| 4 | Polyxyleneadipamide/vinylidene chloride-methyl acrylate copolymer (15μ/3μ). | 162.5 | 94.0 | 5.5 |
| Reference example 2 | Polypropylene/vinylidene chloride-methyl acrylate copolymer (20μ/3μ). | 80.0 | 12.5 | 45.0 |
| " | Polyethylene terephthalate/vinylidene chloride-methyl acrylate copolymer (20μ/3μ). | 123.7 | 45.3 | 27.2 |

TABLE 3

| Anchor coating agent | Peel strength (g./10 mm.) | Heat seal strength (kg./15 mm.) Before heated* | After heated* | [Gas] Oxygen transmission rate (ml./m.², 24 hr.·atm.) |
|---|---|---|---|---|
| Alkyltitanate (i.e., a mixture of tetraisopropyltitanate | Not peeled | 2.4 | 1.5 | 9.0 |

TABLE 3-continued

| Anchor coating agent | Peel strength (g./10 mm.) | Heat seal strength (kg./15 mm.) Before heated* | After heated* | [Gas] transmission rate (ml./m.², 24 hr.·atm.) |
|---|---|---|---|---|
| and tetrabutyltitanate). | | | | |
| Triphenyrolpropane-toluylene-diisocyanate adduct | " | 2.7 | 3.4 | 9.1 |
| Polyester-urethane | " | 2.6 | 2.8 | 9.0 |
| None | 80 | 2.5 | 1.0 | |

*Heating is effected in hot water of 95° C for 30 minutes.

TABLE 4

| Binding agent | Peel strength (g./10 mm.) | Heat seal strength (kg./15 mm.) Before heated* | After heated* | [Gas] Oxygen transmission rate (ml./m.², 24 hr.·atm.) |
|---|---|---|---|---|
| Polyester-urethane | Not peeled | 1.6 | 1.5 | 8.9 |
| Triphenyrolpropane-toluylene-diisocyanate adduct | " | 1.6 | 1.6 | 8.9 |
| Trimethyrolpropane-toluylene-diisocyanate adduct | " | 1.6 | 1.5 | 9.1 |
| RV-300 plus xylene resin triphenyrolpropane-toluylene-diisocyanate | " | 1.3 | 1.1 | 9.1 |

*Heating is effected in hot water of 95° C. for 30 minutes.

TABLE 5

| | oxygen [Gas] transmission rate (ml./m.²·24 hr.·atm.) | Days up to change to brown |
|---|---|---|
| Film number: | | |
| (A) | 8.5 | >30 |
| (B) | 23.0 | 7 |
| (C) | 38.1 | 4 |
| (D) | 9.1 | >30 |

What is claimed is:

1. A composite film comprising (A) a biaxially drawn film of a polyamide containing in the molecule not less than 70% (mol) of the repeating unit consisting of metaxylylenediamine or its mixture with paraxylyenediamine, wherein the paraxylylenediamine content is not more than 30% (mol) on the basis of the total amount of methaxylylenediamine and paraxylylenediamine, and an $\alpha,\omega$-aliphatic dicarboxylic acid having 6 to 10 carbon atoms and (B) a layer of a thermoplastic resin having a melting point or the softening point at least 50° C. below the melting point or the softening point of the polyamide provided on at least one surface of the biaxially drawn film;

the biaxially drawn film having the following physical constants:

(1) [Gas] *Oxygen* permeability constant: (at 30° C.): not more than $9\times10^{-13}$ ml. cm./cm.² sec. cm. Hg;

(2) Plane orientation index: not less than 0.025;

(3) Degree of balance: not more than 0.045;

(4) Breaking strength: not less than 10 kg./mm.² in machine and transverse directions;

(5) Breaking elongation: 30 to 150% in machine and transverse directions;

(6) Yield strength: not less than 5 kg./mm.² in machine and transverse directions; and (7) Yield elongation: 2 to 6% in machine and transverse directions;

and the composite film having the following physical constant:

(8) [Gas] *Oxygen* transmission rate (at 30° C.): not more than 50 ml./m.²·24 hr.·atm.

2. The composite film according to claim 1, wherein the [gas] *oxygen* transmission rate is not more than 30 ml./m.² 24 hr. atm.

3. The composite film according to claim 1, wherein the thickness of the biaxially drawn film is 5 to 50$\mu$.

4. The composite film according to claim 1, wherein the thickness of the composite film is 6 to 200$\mu$.

5. The composite film according to claim 1, wherein the melting point of the thermoplastic resin is 50 to 170° C.

6. The composite film according to claim 1, wherein the thermoplastic resin is a polyolefin resin.

7. The composite film according to claim 1, which is heat sealable at a temperature of 70 to 160° C.

8. The composite film according to claim 1, wherein the thickness of the thermoplastic resin is about 5 to 100$\mu$.

9. The composite film according to claim 1, wherein the polyamide has a relative viscosity of about 2.0 to 4.0.

10. The composite film according to claim 1, wherein the polyamide is a homopolymer selected from the group consisting of polymetaxylylene adipamide polymetaxylylene sebacamide and polymetaxylylene suberamide.

11. The composite film of claim 1, wherein the polyamide is selected from the group consisting of copolymers of metaxylylene/paraxylylene adipamide, metaxylylene/paraxylylene pimelamide, metaxylylene/paraxylylene sebacamide and metaxylylene/paraxylylene azelamide.

* * * * *